(No Model.)
L. T. EDWARDS.
ELECTRIC BROILER OR TOASTER.
No. 533,795. Patented Feb. 5, 1895.
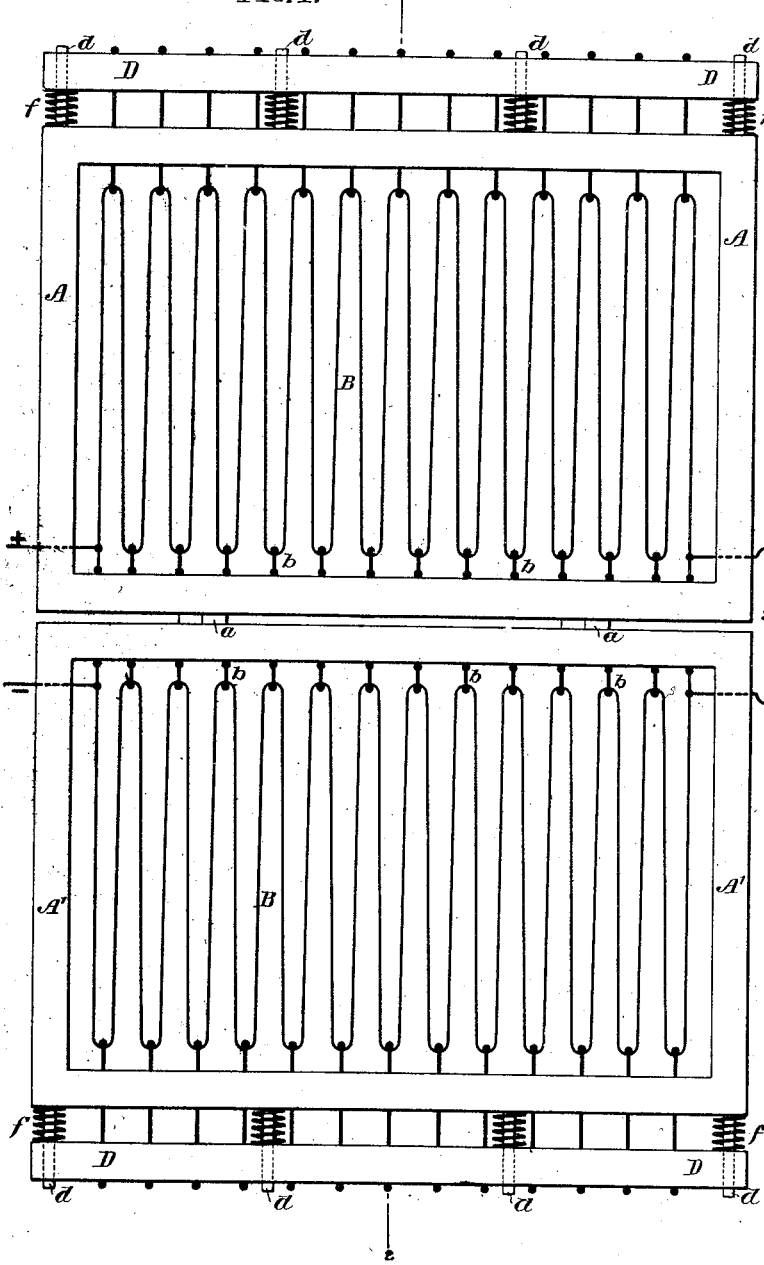
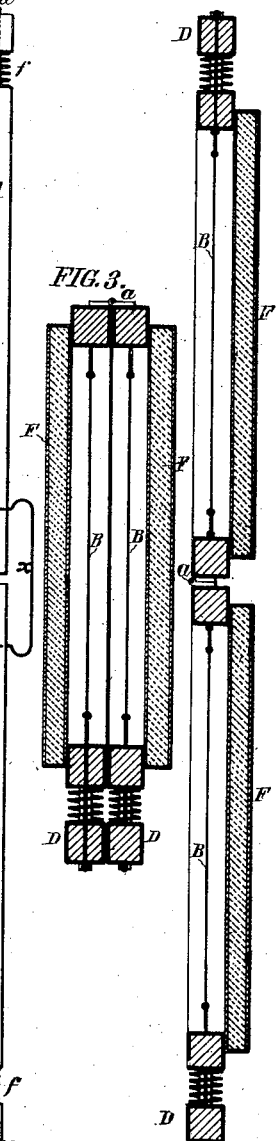
Witnesses:
Hamilton D. Turner
Frank E. Bechtold
Inventor:
Levi T. Edwards
By his Attorneys
Howson & Howson

UNITED STATES PATENT OFFICE.

LEVI T. EDWARDS, OF HAVERFORD, PENNSYLVANIA.

ELECTRIC BROILER OR TOASTER.

SPECIFICATION forming part of Letters Patent No. 533,795, dated February 5, 1895.

Application filed March 2, 1894. Serial No. 502,071. (No model.)

*To all whom it may concern:*

Be it known that I, LEVI T. EDWARDS, a citizen of the United States, and a resident of Haverford, Pennsylvania, have invented 5 certain Improvements in Electric Broilers or Toasters, of which the following is a specification.

My invention consists of an electric broiling or toasting device constructed with reference to the utilization of the electric current in the most effective manner consistent with the safe and convenient handling of the device and with the provision of the needed facilities for thoroughly cleaning it after it has been in use.

My invention comprises certain constructions and combinations of parts fully described and specifically claimed hereinafter.

In the accompanying drawings: Figure 1, is a top or plan view of one form of my improved electric broiler or toaster, showing the two parts of the same separated or opened out. Fig. 2, is a sectional view on the line 2—2, Fig. 1; and Fig. 3, is a sectional view showing the device folded together as when it is intended for use.

A and A' represent two oblong rectangular frames, preferably constructed of metal coated with enamel or other insulating material, these frames being united by hinges $a$ so that they can be opened out, as shown in Fig. 2, or closed together, as shown in Fig. 3. Each frame carries a grid B composed of a wire of some material which will present the desired resistance to the flow of the electric current and will thus become heated to the desired degree when said current is passed through the same. The wire may, if desired, be uncovered, but it is, by preference, provided with a coating of enamel or like vitreous insulating material which will not materially obstruct the transmission of heat from the wire. Each grid is formed by carrying the wire back and forth in a zig-zag course and at each bend or angle a supporting rod or wire $b$ is connected to the grid, this supporting rod or wire being either of non-conducting material or being so insulated that no current will be conveyed to the supporting frame B. At one side of the grid, the supporting rods or wires are rigidly connected to the frames A or A', but at the other side of the grid said supporting rods or wires pass through openings in the bar of the frame and are connected to a bar D beyond the same, said bar D being mounted upon projecting pins $d$ and being acted upon by a coiled or other equivalent spring $f$ which tend to project it and thus maintain each grid constantly under proper tension.

In the case of a duplex broiler or toaster, such as shown in the drawings, the inner sides of the grids will be rigidly attached to the inner bars of the frames, the tension connections being at the outer sides, as shown in the drawings. The electric current entering say through the + wire, traverses one grid B and then passes through a connecting wire $x$ to the opposite grid after traversing which it returns through the — wire to the generator.

Each of the frames A A' is provided with a cap or cover F consisting of a box or casing of sheet metal filled with mineral wool or equivalent non-conductor of heat.

In using the device the article to be broiled or toasted is deposited on one of the grids when the frame is open and the said frame is then closed, as shown in Fig. 3, so as to confine the article between the two grids and thus subject the same to heat on both sides.

The caps or covers F serve a three-fold purpose, that is to say, they prevent the radiation of heat, they serve as heat reflectors and the one which is undermost also serves as a drip catcher. These caps or covers F are, by preference, so secured to the frames A A' that they can be readily detached therefrom for cleaning purposes.

By mounting the grids B upon the frames A A' by means of insulating connections as described, the current is confined entirely to the grids and there is no waste such as would be caused by the passage of current through the supporting frame or any part of the same, safety in the handling of the device also resulting from this insulation of the grids from the frames.

By providing the wire of which the grids are composed with a coating of enamel, or like vitreous insulating material which will not offer any material resistance to the transmission of heat, I am enabled to secure the maximum heating effect and yet provide a grid to which animal or vegetable matters will not readily adhere and from which such matters as may adhere can be readily removed by washing.

While I have shown my invention as applied to a frame comprised of two parts hinged together, and although I prefer this construction, the invention may be embodied in a structure in which the two frames are disconnected and are simply laid one upon the other when in use, or but a single frame may be used in some cases, such frame being used in the same manner as an ordinary grid iron.

When the double frame is employed the under-cap F may be dispensed with in cases where the broiler is deposited upon a plate or in a pan when in use.

Having thus described my invention, I claim and desire to secure by Letters Patent—

1. An electric broiler or toaster consisting of a frame, a grid contained within the space bounded by said frame, and through which the current is intended to pass and insulating connections between the opposite side portions of said grid and the frame, substantially as specified.

2. An electric broiler or toaster consisting of a frame, and an exposed grid supported within the space bounded by said frame and consisting of an electric conductor forming the bars of the grid and having a coating of enamel or like vitreous insulator offering but little resistance to the transmission of heat, the bars of the grid with their enamel coatings being separated one from another, substantially as specified.

3. An electric broiler or toaster consisting of a frame, a spring actuated bar beyond the same, a grid contained within the space bounded by said frame and consisting of a wire carried backward and forth in a zig-zag course and insulated from the frame, means for rigidly connecting one side of said grid to one of the bars of the frame, and means for rigidly connecting the other side of the grid to the spring bar, substantially as specified.

LEVI T. EDWARDS.

Witnesses:
SAMUEL SEMPLE,
OSCAR M. CHASE.